(12) United States Patent
Lotz et al.

(10) Patent No.: US 6,916,425 B2
(45) Date of Patent: Jul. 12, 2005

(54) MASHING PROCESS

(75) Inventors: Markus Lotz, Freising (DE); Horst Randhahn, Darmstadt-Eberstadt (DE); Rolf Berndt, Dietzenbach (DE); Gebhardt Muller, Dreieich (DE)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/837,755

(22) Filed: Apr. 19, 2001

(65) Prior Publication Data

US 2002/0050477 A1 May 2, 2002

Related U.S. Application Data

(63) Continuation of application No. 09/639,660, filed on Aug. 16, 2000, now abandoned, which is a continuation of application No. 09/480,141, filed on Jan. 10, 2000, now abandoned, which is a continuation of application No. 09/319,026, filed as application No. PCT/EP97/06490 on Nov. 20, 1997, now abandoned.

(30) Foreign Application Priority Data

Nov. 29, 1996 (DE) .......................................... 196 49 661

(51) Int. Cl.$^7$ ............................................... B01D 61/00
(52) U.S. Cl. ........................ 210/650; 210/651; 426/489
(58) Field of Search ................................ 210/650, 651, 210/232, 321.69, 359, 364; 426/489; 536/56

(56) References Cited

U.S. PATENT DOCUMENTS

| | | |
|---|---|---|
| 1,762,560 A | 6/1930 | Morton |
| 2,399,710 A | 5/1946 | Schock |
| 3,962,478 A | 6/1976 | Hohlbein et al. |
| 4,066,546 A | 1/1978 | Sasaki |
| 4,197,321 A | 4/1980 | Chyba et al. |
| 4,696,433 A | 9/1987 | Lenz et al. |

(Continued)

FOREIGN PATENT DOCUMENTS

| | | |
|---|---|---|
| DE | 28 36 866 | 3/1980 |
| DE | 3401 607 C2 | 7/1986 |
| DE | 42 07 614 C1 | 9/1993 |
| DE | 43 29 077 C1 | 7/1994 |
| EP | 0 370 118 B1 | 5/1990 |
| EP | 0 560 281 B1 | 6/1993 |
| FR | 1535555 | 7/1968 |
| GB | 2263856 | 11/1993 |
| WO | WO 92/12231 | 7/1992 |

OTHER PUBLICATIONS

R. Junker; XP–002073603 "Einfluss von Enzymierung und Schonung auf den Kolloidgehalt bzw. die Filtrierbarkeit von Saft aus schwarzen Johannisbeeren" in Flussiges Obst, vol. 61, No. 6/7, 1994; pp. 262–265.

T.M. Buhler, et al.; "The Application of Membranes for New Approaches to Brewery Operations" EPC Kongress 1993; p. 76 et. seq.

D.B. Pall; "Bacterial Removal Mechanism in Membrane Filters"; Pall Corporation, Colloid and Surface Science Symposium, 1978; pp. 224–225.

J. W. Daily, et al.; "Chamber Dimension Effects on Induced Flow and Frictional Resistance of Enclosed Rotating Disks"; (Journal of Basic Engineering), 1960, pp. 217–232.

R. E. Nece, et al.; "Roughness Effects on Frictional Resistance of Enclosed Rotating Disks"; (Journal of Basic Engineering) 1960, pp. 553–562.

Shirato; Application of Supersonic Waves to the Food Industry (1987); vol. 22, No. 10; pp. 32–37.

*Primary Examiner*—Ana Fortuna
(74) *Attorney, Agent, or Firm*—Leydig, Voit & Mayer, Ltd.

(57) ABSTRACT

Specification discloses the use of a dynamic cross-flow filtration system for the filtration of mash. Also disclosed are a mashing process, wherein mash is filtered and wort is obtained, and a process for the preparation of beer, as well as apparatuses and devices for performing one or more of these process.

10 Claims, 4 Drawing Sheets

U.S. PATENT DOCUMENTS

Figure 1:
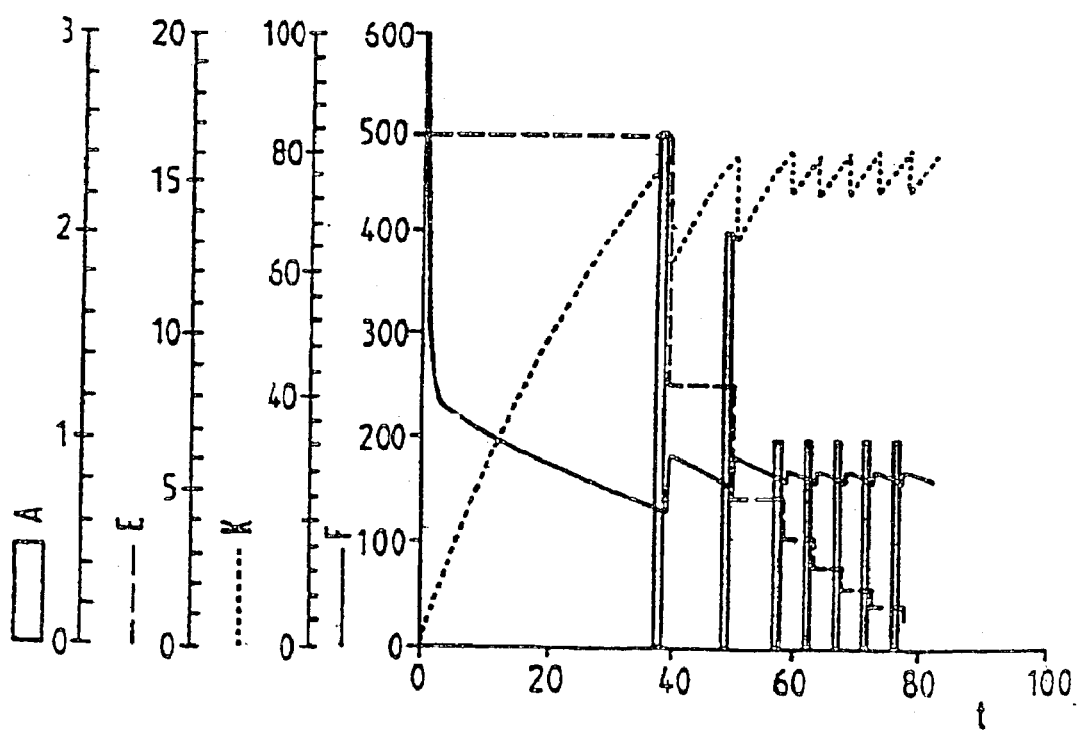

| | | | |
|---|---|---|---|
| 4,844,932 A | * | 7/1989 | Daoud |
| 4,872,404 A | | 10/1989 | Quetsch et al. |
| 4,925,557 A | | 5/1990 | Ahlberg, Jr. et al. |
| 4,943,374 A | | 7/1990 | Heininger et al. |
| 5,014,564 A | | 5/1991 | Culkin |
| 5,143,630 A | | 9/1992 | Rolchigo |
| 5,254,250 A | | 10/1993 | Rolchigo et al. |
| 5,415,781 A | * | 5/1995 | Randhahn et al. |
| 5,453,285 A | * | 9/1995 | Versteegh |
| 5,536,650 A | * | 7/1996 | Versteegh |
| 5,648,246 A | * | 7/1997 | Versteegh |
| 5,670,043 A | * | 9/1997 | Lee |
| 5,679,249 A | | 10/1997 | Fendya et al. |
| 5,707,517 A | * | 1/1998 | Rochilgo et al. |
| 5,739,316 A | * | 4/1998 | Beer et al. |

* cited by examiner

MASHING PROCESS

This application is a continuation of U.S. application Ser. No. 09/639,660, which was filed on Aug. 16, 2000, and is now abandoned and which was a continuation of U.S. application Ser. No. 09/480,141, filed Jan. 10, 2000 which is now abandoned and was a continuation of U.S. application Ser. No. 09/319,026, filed Jul. 29, 1998 which is now abandoned and was the national phase of International application No. PCT/EP97/06490, which was filed on Nov. 20, 1997, and which claimed priority of Germany Application No. 196 49 661.6, which was filed on Nov. 29, 1996, all of which are incorporated by reference.

The invention relates to processes for mashing. In addition, the invention relates to special mash filter devices and processing devices, as well as their use.

Mashing is an important process step in the preparation of beer. Here, the solid starting material malt, and the grist ground therefrom in a defined way, respectively, are subjected to a dissolution process with water in temperature/time intervals. The directly water soluble malt ingredients, sugar, β-glucanes, pentonsanes, protein products, lipids and polyphenols are directly dissolved. The most important component, the malt starch, is degraded by enzymes present in the malt or added externally, and thus brought into a water soluble form. With the solution of those ingredients and the separation of the non-dissolved components, the mashing process comes to an end. The solution filtered off—the wort—in terms of its composition is critical for the type and the quality of the beer brewed therefrom.

The differences in the composition of the starting raw fruit (for example barley, corn, rice) are conserved over malting up until mashing. By means of different mashing processes (for a review see Schuster, Weinfurtner, Narziss (1985)) on one hand, the different maltcompositions are controlled and, on the other hand, worts typical for a beer type, are produced.

It is the aim of each of those mashing processes to achieve a high yield (dissolution of all soluble components). After the separation process, the wort should be as free of particles as possible, so that the following steps of beer preparation progress in a controlled and regular manner. Of special importance in this context are low β-glucane contents with regard to the filterability of the future beers and low polyphenol and anthocyanogene contents with regard to the beer's color, taste and colloidal stability.

The separation of undissolved mash components (spent grains), i.e., the isolation of the wort, is called lautering.

Prior Art "Lautering"

Current conventional processes for filtration or separation can basically be divided into two different types, depending on their instrumental implementation. Here, usually lauter turn or mash filter are used, which both form a filter cake due to sediments of malt particles on a coarsely porous filter medium, which permits a separation of solids from the work (cake-filtration).

When using a lauter tun, basically a continuous filtration is carried out over large sieves with regular passage openings in the range of 700 to 1.200 $\mu$m. The mash is pumped into the lauter turn and the husks and coarse malt grain components start sedimenting, forming a coarse, primary filter layer on the bottom of the lauter tun. Once this filter layer has achieved a certain thickness, the mash is allowed to flow through the primary filter cake by influence of gravity. By further finer particles in the mask, a denser secondary filter layer is formed. Due to many solids still flowing through the primary filter layer at the beginning of the filtration, the effluent wort is recirculated from the top into the lauter tun, until the wort flowing off is sufficiently lean of solids. The clearing effect, therefore, is predominantly determined by the secondary layer, which is growing and densifying by deposited particles. If the flow-through rate decreases below a certain value due to an excessive compression of the filter, the accumulated filter cake has to be loosened up by the mechanical means, usually with a so-called chopper. Usually, the filter cake must then be leached with hot water up to three times to utilize the wort still present in the filter cake.

The mash filter is a chamber filter. With the mash filtration process, the mash is pumped into the chambers of the filter after mashing. The plates of the individual filter chambers are coated with filter cloths on both sides. As a rule, the filter cloths predominantly consist of polymer tissue, e.g., polypropylene, polyamide or, with older designs, of cotton cloths.

A typical feature of the mash filter are passage openings of the filter cloths of about 100 $\mu$m diameter. Also, with this filtration process, the actual separation mechanism is that the mash has to flow through a filter cake accumulating on the filter cloths. Also, with the filtration process by mash filters, a part of the wort withdrawn at the beginning, the so called initial feed, has to run through the filtration process again, since the amount of solids is still too high. Also, with the mash filter, aftermashes with hot water are necessary, in order to obtain the residual wort contained in the filter cake.

A disadvantage of the filtration processes described so far is the necessity to carry out the grinding of the utilized fruit only up to a certain lower limit for the particle size.

Typical compositions of lauter tun grist and mash filter grist are given in table 1 (according to Krüger E., Bielig H. J., (1976)).

TABLE 1

Composition of lauter tun grist and mash filter grist (Specifications in % by weight)

| Fraction | Grist for lauter tun | Grist for mash filter |
|---|---|---|
| Glume of grains % > 1270 $\mu$m | 18 | 11 |
| Coarse semolina % > 1010 $\mu$m | 8 | 4 |
| Fine semolina I % > 547 $\mu$m | 35 | 16 |
| Fine semolina II % > 253 $\mu$m | 21 | 43 |
| Flour % > 152 $\mu$m | 7 | 10 |
| Flour powder % ≤ 152 $\mu$m | 11 | 16 |

Numerous studies of the sixties and seventies describe a more extensive fine grinding of barley malt (Kienanger H., (1977), Schöffel F., (1972)) with the aim of achieving higher extract yields with shorter mashing times. A utilization of these finely ground malts, even with the complete husk portion, substantially failed due to a lack of suitable separation processes and devices for separation of the wort (Deublein D., Schöffel F., (1980)). the utilization of an alternative separation technique—vacuum drum filters—known as the "Reiter Process" (Reiter F., Brauwelt 102 (1962), 104 (1964)) did not constitute a satisfying solution, either.

Such a limitation of the fine parts in the malt grists is, however, not desirable in terms of the brewing process. Basically, the objective is to achieve the finest possible comminution of the malt. A fine comminution of the malt permits faster enzymatic degradation during mashing by increasing the surface active for matter transfer. The starch grains and the protein-rich malt fractions are stripped from surrounding structural matter. This leads to a general shortening of mashing time and a better processing of malts with reduced solubility. Furthermore, if it is possible to omit a major part of the husks as a filtration medium, advantages in terms of taste result for the beer. To allow the processing of finely ground malt in the mashing process, attempts were made to carry out a cross-flow filtration of the mash, instead of the filtration process mentioned above.

In "EPC Kongreβ 1993", p 76 et seq., Bühler et al. describe the use of membranes for new approaches in brewery operations. In particular, they mention a conventional cross-flow mash filtration by means of membranes.

Document U.S. Pat. No. 5,415,781 discloses an apparatus and method for separating a feed fluid into a filtrate and a concentrate where feed fluids are separated into a less concentrated and a more concentrated phase. The separation is achieved by utilizing a dynamic cross-flow filtration system. The use of dynamic cross-flow filtration systems for separation of wort from mash is not disclosed.

Document U.S. Pat. No. 5,707,517 relates to rotary disc filtration devices and their use for separation of solid and liquid phases in fluids. The separation of wort from mash by using a dynamic cross-flow filtration is not disclosed.

With cross-flow filtration, a flow of the suspended mash is produced parallel to the surface of the filter medium, in order to prevent particle deposition as far as possible. Unlike the cake filtration method described above, ideally the solids do not form a cake on the filter medium, i.e. the mash is usually lautered solely by means of the filter medium used. While the cross-flow filtration systems should be basically suited for use in the lautering of mash from finely ground malt, in practice, however, problems arise, which have impeded the utilization of this filtration process so far.

For instance, cross-flow filtration processes require high pressure to facilitate the high flow rates necessary to achieve the high shearing forces on the surface of the filtration medium, which are prerequisite for carrying out the filtration process. Furthermore, pressure differences on the surface of the filter cause pressure gradients, which may block the filter. And whenever such pressure differences are particularly marked, they may cause the wort already filtered to flow back through the filter medium, which clearly decreases the efficiency of the process.

It is therefore an object of the present invention to provide a process, which is improved with respect to the current industrially applied mashing processes, especially a process which facilitates.

short mashing times, highest yields of carbohydrates (highest extract yield), flexibility with regard to instrumental expandability in small steps, flexibility with regard to the product, especially facilitation of controlling the characteristics of the beer, which are specific for a certain beer type, by controlling the parameters of the mashing process, a simple execution of the process, an improved quality of the wort for improved beer quality, a continuous, or virtually continuous process, elimination of the need to recirculate the initial feed, the production of a wort essentially free of solids, the production of a mash which is improved as to the subsequent steps of the beer production process, especially a mash which is leaner in β-glucane.

This object is solved according to the present invention by mashing processes, devices and specific uses of the devices as defined in the claims. Preferred embodiments will be apparent from the dependent claims as well as from the examples.

Subject matter of the invention is, therefore, a mashing process, where mash is filtered and wort is obtained, where the mash is fed to the filter material of a dynamic cross-flow filtration system, wort is withdrawn from the side-stream side of the filter material and thickened remainder is withdrawn from the feed side of the filter material.

The term "dynamic cross-flow filtration system" as used herein refers to a means for filtration, where the material to be filtered is moved in a volume segment between a filter surface and a further surface, with at least an essential component of the relative velocity between the material to be filtered and the filter surface, running along the filter area perpendicular to the normal of the filter area (cross-component). This cross-component is essentially produced by movement of surfaces within the cross-flow filtration system itself relative to the material to be filtered. Thus, the cross-component can, for example, be generated by rotating disks in a short distance from filter surfaces or by filter disks, oscillating at least also azimuthal and with respect to their perimeter, respectively, or with rotating or oscillating concentrical cylinders. Preferably, the relative velocity of the filter surface with respect to the central area of the flow channel is in the range of 3 to 20 m/sec, especially 4 to 12 m/sec. With oscillating relative movements, the above specification refers to the product of excursion (m) and frequency ($sec^{-1}$). The further surface can also be a filter surface.

According to the present invention it is possible, when using the dynamic cross-flow filtration device, to decouple the cross-component of the overflow velocity of the mash or the suspension (the controlling quantity for the prevention of a possible blocking or coating of the membrane) from the trans-membrane pressure difference (the quantity controlling the filter flow). It is believed that the observed valuable results of the process according to the present invention are based on this difference of the dynamic cross-flow filtration system in comparison with conventional filtration devices, i.e. device without moving parts in the filtration means.

The mashing process according to the present invention preferably exhibits one or more of the following features:

a. as a dynamic cross-flow filtration system, a dynamic cross-flow filtration system with rotating disks or concentrically rotating cylinders or with oscillating disks, is used;

b. as a filter material a material selected from:
polymer membrane, especially polyamide membranes, poly(tetrafluoroethylene) membranes (PTFE membranes), poly(vinylidenefluoride) membranes (PVDF membranes), preferably selected from membranes with a retention rate (measured after Pall, Colloid and Surface Science Symposium, Tennessee (1978)) of below 2 $\mu$m, more preferably of 1 $\mu$m to 0.04 $\mu$m, most preferably about 0.1 $\mu$m;
steel;
nickel; or
ceramic;
or a combination of two or more of such materials is used;

c. as a dynamic cross-flow filtration system a closed, preferably pressurized dynamic cross-flow filtration system is used.

In the process according to the present invention usually all malts and resulting mashes, which have also been used in the hitherto applied filtration processes, can be used. However, unlike the currently used processes, the process according to the present invention also permits the use of malts which have a strongly reduced solubility compared to average malts. The term "malts with reduced solubility", as used in accordance with the present invention, is meant to refer to malts which have the following values according to MEBAK:

friabilimeter-value<80% by weight, glassy (ganzglasige) grains>3% by weight, flour/grist difference>2%, viscosityη>1.6 m Pa*sec and saccharification-value 145° C.<36.

In accordance with the present invention it is of special advantage, when the malt used with the process according to the invention exhibits a reduced husk content, which may be achieved by any form of separation of husk from grain which is known to the person skilled in the art in the field of husk separation. The malt grist and malt flour, respectively, husk-reduced in the manner described above, is used accordingly for the production of mashes with a reduced, husk content. The mash used with the process according to the invention preferably has a husk content of 40 to 95% by weight, more preferred a husk content of 50 to 80% by weight, in terms of the husk content in the starting mash as 100% by weight. The reduction of the husk content by 5 to 60% by weight may also be effected by mixing with husk-free fruit or other carbohydrate sources.

Since the process according to the invention offers the possibility to use very finely ground malt flours, the mash produced from this fine malt flour contains starch particles with a grain size of below 100 μm. Preferably, the starch particles have a particle size distribution where 99% of the particles are below 100 μm grain size, 70% of the starch particles are below 65 μm grain size, with a significant portion of the starch particles preferably having a bimodal particle size distribution (determined with a laser diffraction spectrometer; Helossystem, Sympatec) with distinct maxima at about 5 μm and about 25 μm.

Preferably the used mash is derived from finely ground powder grist, 75% of the particles being smaller than 150 μm. Typically, those particles do not have a distinct bimodal distribution.

The malts used for the preparation of the mash can have a normal solubility, however, also at least partially malts with a reduced solubility can be used.

Instead of using only one type of malt flour for the mash with the process according to the invention, it is also possible to use a mixture of at least two malt flours, with different specifications. Thus, influencing of the beer character and a more regular performance of the brewing process is attainable in a most simple manner.

A further advantage of the process according to the invention resides in that the character of the wort can be controlled by the adjustment of different process parameters. With the process according to the invention, it is advantageous to work with the flow velocities, pressures and temperatures shown in the following table:

TABLE 2

Preferred process parameters
Preferred parameters of the process according to the invention

| Parameter | Range |
| --- | --- |
| Wort-flow | 90–250, preferably 130–200 1/hm$^2$ |
| Temperature | 70–90° C. |
| Transmembrane pressure difference | 0.2–4 preferably 0.3–3 bar |

A further advantage of the process according to the invention resides in that the spent grain portion of the mash is acceleratedly edulcorated by the dynamic of the mash flow.

The process according to the invention can be operated with one dynamic cross-flow filtration system. In alternative embodiments, however, it can also be operated with at least two dynamic cross-flow filtration systems in serial order. Herein, preferably the first wort is obtained from the first dynamic cross-flow filtration system, while from the second step and possibly from further steps, second wort and spent grain is obtained. The first wort and second wort are combined to give the Pfannenvollwürze. When two or more dynamic cross-flow filtration systems are used, the process of mash filtration can be designed continuous. With the process according to the invention, the desired upper limit for the particle diameter of the particles remaining in the wort can be determined by choosing the pore size of the filter medium. Usually, it is filtered such that the obtained wort is essentially free of particles which are larger than 0.1 μm.

In contrast to the conventional processes which are described in the prior art, with the process according to the present invention, even at the beginning of the filtration step, an optimum filtration result can be attained with regard to the upper limit of the particle size for particles in the wort. Therefore, the process according to the invention is operated preferably without recirculation of the initial feed.

The invention also relates to a process for the production of beer, wherein mash is filtered, the wort obtained is fermented with yeast, and the produced beer is recovered, wherein the mash is filtered by means of a dynamic cross-flow filtration system.

For the production of beer in accordance with the present invention, a mash is used, which at least partially consists of a flour with one of the two following particle size distributions A or B:

| A. Partially de-husked, pulverized bimodal | B: "Reiter"-grist |
| --- | --- |
| 100% < 125 μm | 99% < 600 μm |
| 80% < 60 μm | 80% < 200 μm |
| 60% < 35 μm | 75% < 150 μm |
| 40% < 25 μm | 60% < 80 μm |
| 20% < 10 μm | 40% < 40 μm |
| | 20% < 20 μm |

The present invention further relates to the use of a dynamic cross-flow filtration system for the filtration of mash.

The dynamic cross-flow filtration system used according to the present invention preferably has rotating disks or cencentric rotating cylinders or oscillating disks. In accordance with the present invention, the use of dynamic cross-flow filtration systems is especially preferred, wherein the separation material is at least partially a microporous membrane, especially a microporous polyamide membrane, a microporous PTFE membrane or a microporous PVDF membrane, preferably a membrane with a retention rate of below 2 μm, more preferably from 1 μm to 0.04 μm, most preferably of about 0.1 μm.

Thus, the present invention also relates to the use of a dynamic cross-flow filter, as defined in the present specification of the process according to the invention or of the devices according to the invention, for the filtration of mash.

The production of beer using the process according to the present invention can be carried out in all equipments usually intended for this purpose, as long as a dynamic cross-flow filtration system, as described above, is used as a filter element. Usually, such equipment for beer production has at least one vessel for the reception of mash, a so called mashtun (Maischbottichpfanne), which is supplied with a heating device provided with a thermostat, for the execution of the mashing process. There are different processes known for the mashing process, differing with regard to temperature progress and duration of the mashing process, which are all usable according to the present invention and which can be used together with the dynamic cross-flow filtration system as described in the present invention. Besides one or more vessels for the reception of mash, the equipment for the production of beer according to the invention has a dynamic cross-flow filtration system, which can receive mash via an inlet and leads the mash to the feed side of a filter material used in the dynamic cross-flow filtration system, and a device for withdrawal of the wort from the side-stream side of the filter material.

Furthermore, the equipment according to the invention for the production of beer has a device which allows to transfer the mash from the vessel to the inlet device of the dynamic cross-flow filtration system.

Thus, the invention further relates to a device for the execution of a mashing process, comprising:
 a. at least one vessel for the reception of mash, which is supplied with a heating device provided with a thermostat;
 b. a dynamic cross-flow filtration system for the reception of the mash, with an inlet for the mash at the feed side of the filter material and a device for the withdrawal of the wort from the side-stream side of the filter material, and a device for withdrawal of the thickened mash from the dynamic cross-flow filtration system;
 c. a device for the transfer of the mash from the vessel to the inlet of the dynamic filtration device.

Preferably, the filter material for operating the device according to the invention is selected from:
 polymer membranes, especially polyamide membranes, PTFE membranes, PVDF membranes, preferably such membranes which have a retention rate (measured according to Pall, Colloid and Surface Science Symposium, Tennessee (1978) below 2 μm, more preferably of 1 μm to 0.04 μm, most preferably of about 0.1 μm;
 steel;
 nickel or
 ceramic
 or a combination of two or more of such materials.

It is especially preferred that the filter material has a retention rate of less than 2 μm, more preferably from 1 μm to 0.04 μm, or most preferably of about 0.1 μm.

In an especially advantageous embodiment of the invention, the device is distinguished in so far that the dynamic filtration device has at least one rotating disk and two filter plates in a stationary casing.

Preferably, the thickness of the flow channel is about 3 to 30 mm. The diameter of the filter disks is typically in the range of 25 cm to 2.5 m.

The following surprising results have been obtained with the present invention, which are explained in more detail by means of examples, and a technically and economically improved process for the filtration of mash has been created. With this process, where a dynamic cross-flow filtration system is used for the filtration of the mash, it has furthermore turned out that totally new possibilities for the control and variation of the beer itself are facilitated by a simple adjustment of particular parameters with the mash filtration.

In contrast to conventional cross-flow filters, which use channels subjected to forced flow, the present invention uses dynamic cross-flow filtration systems. These differences are depicted schematically in FIG. 2. The present invention provides technical and beer-technological advantages by using dynamic cross-flow filtration systems in the wort recovery and the leaching of the spent grain.

Figure 2:
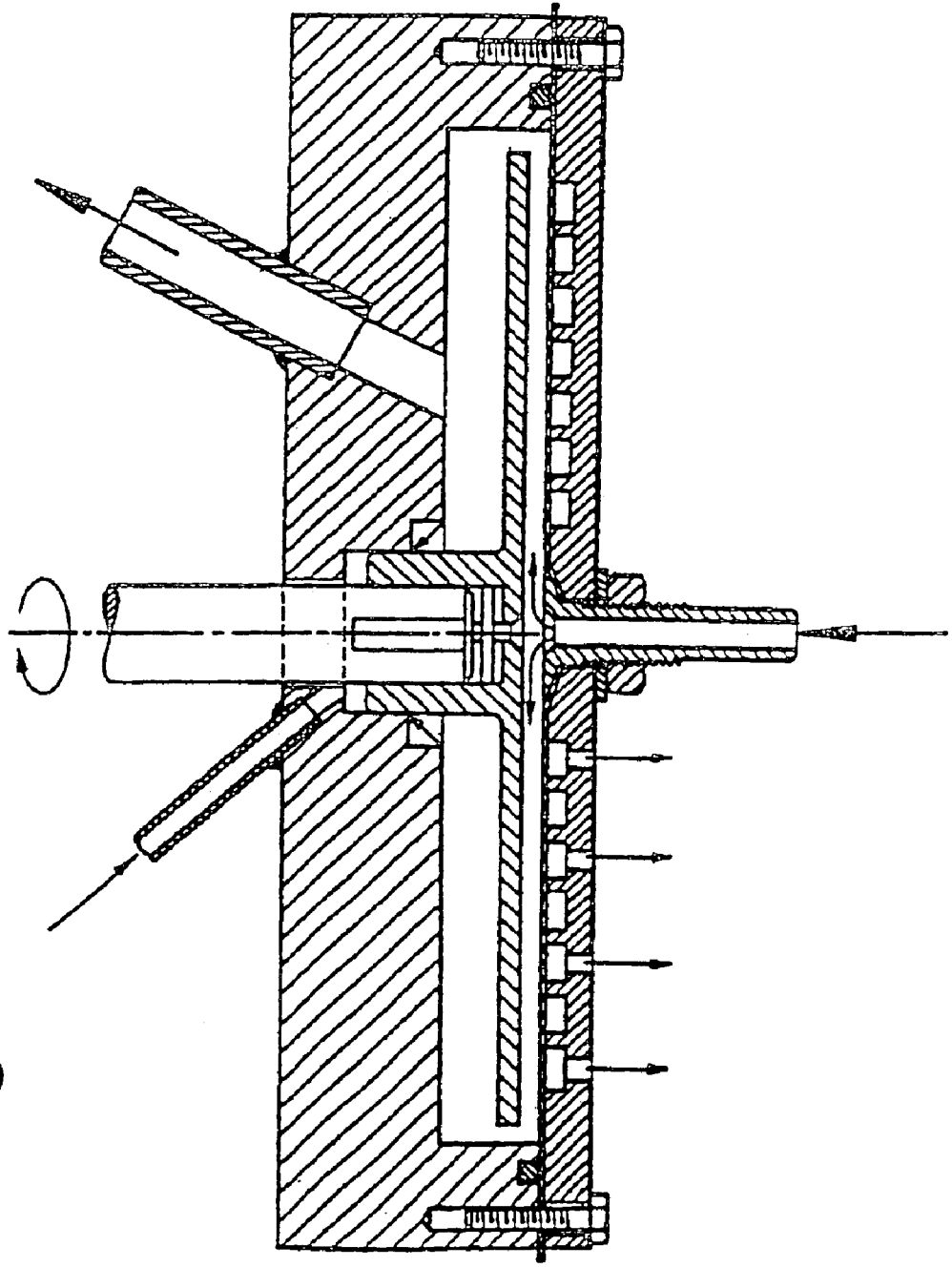
Figure 3:
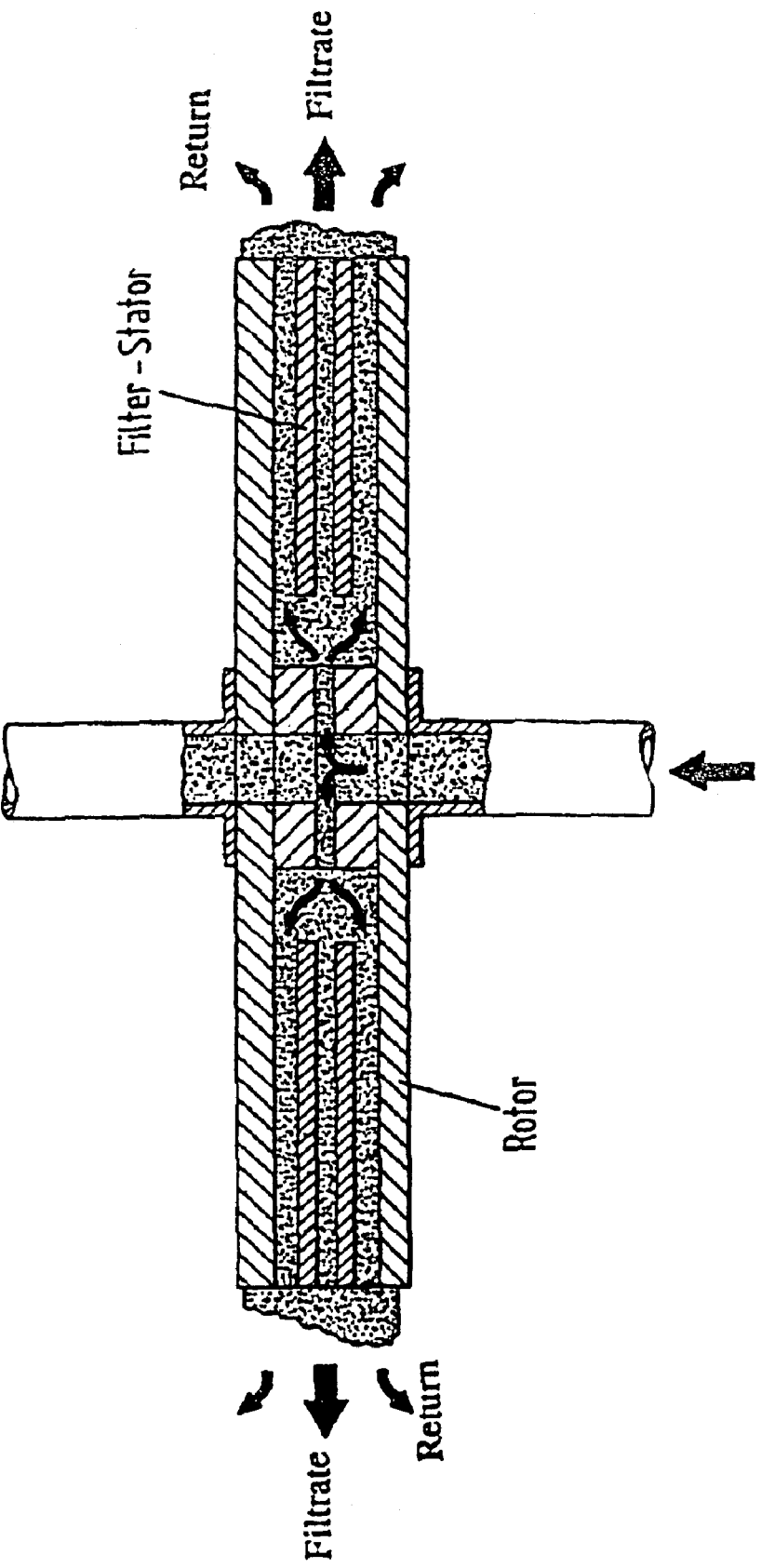
Figure 4:
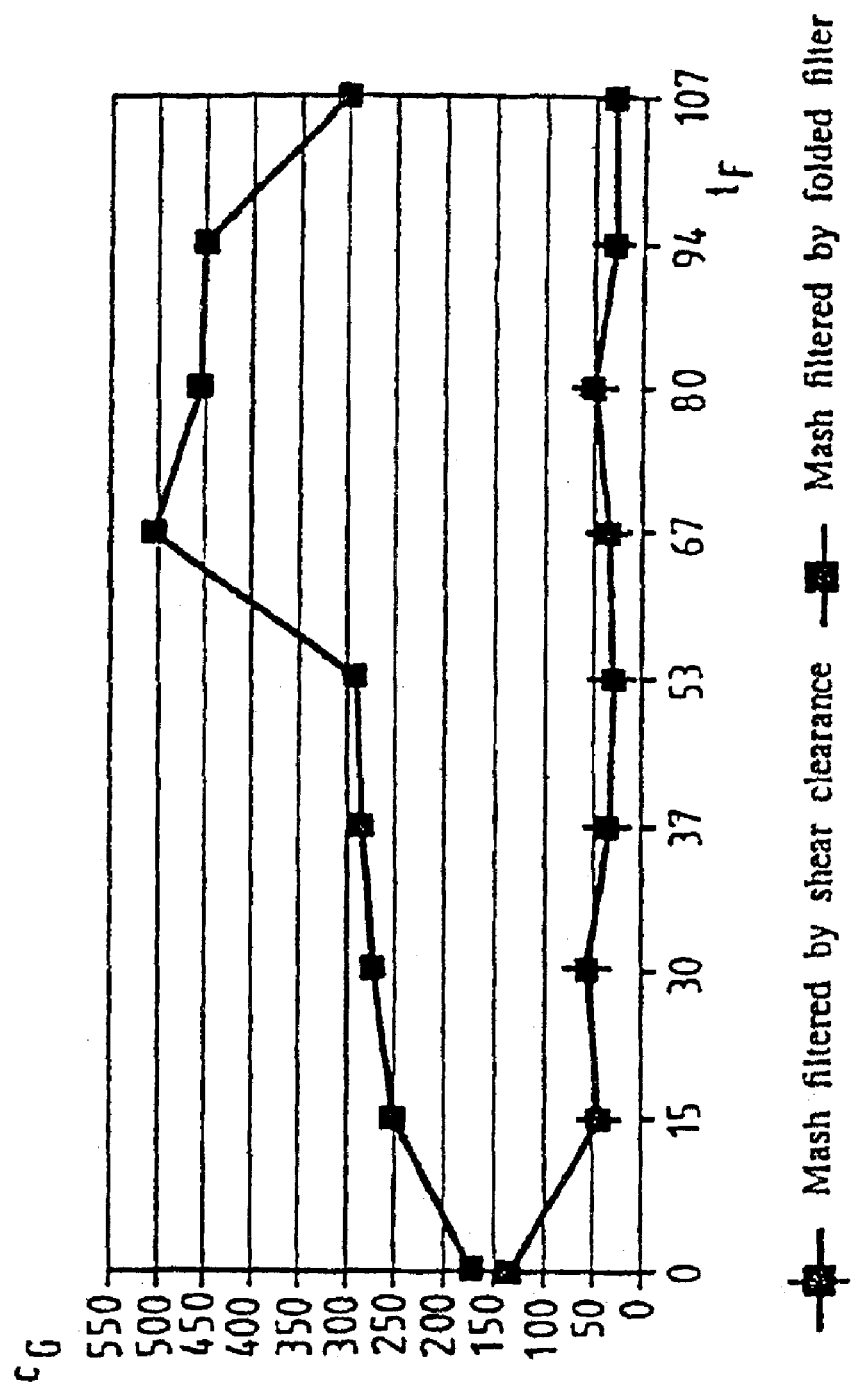

In the following, further parameters, which are well suited for the invention, as well as further and more specific embodiments are described by examples and together with a drawing, in which FIG. 1 shows a diagram with flow, degree of concentration and extract content for powder malt during lautering and edulcoration by means of dynamic cross-flow filtration with a 0.1 μm PTFE membrane, FIGS. 2 and 3 show a dynamic cross-flow filtration system—of the rotating disk type—as functionally described in general in EP 560 281 A1, with reference to said specification, FIG. 4 shows a comparison of the β-glucane content between filtrates of the process according to the present invention on the one hand, and a filtration process with a folded filter on the other hand.

In FIG. 1 the meaning of
 A is "sparging liquor"
 E is "extract of the wort in %"
 K is "degree of concentration mf/mO in %"
 F is "flux in l/(m²×h).
In FIG. 4 the meaning of
 $c_G$ is "β-Glucane in mg/l"
 $t_F$ is "filtration time in minutes".

The following examples have been prepared with a dynamic cross-flow filtration system—of the rotating disk type—as it is shown in FIGS. 2 and 3. For this type of flow, the hydrodynamic conditions have been theoretically described, e.g. in Schulz-Grunnow (1935), Daily and Nece (1960), Ketola (1968), Schiele (1978), Shirato (1987), and correlated with experimental results.

The specified data of the examples is obtained with membranes from the field of microfiltration. Here, polymer membranes, as well as inorganic filter materials, were used. The examples, on the one hand, compare the results under identical conditions parallel to the existing technology. On the other hand, the usability of fine powder malts with clearly reduced husk content, with this technology, is shown, wherein the advantages with regard to shorter mashing times, higher extract yield and reduced undesirable wort contents are proven.

EXAMPLES

Mashing Process

The standardized Eyben-mashing process was used for obtaining this data. The temperature grids for the mashes are 45° C., 62° C. and 70° C. for 30 minutes, heating up with 1° C./min each. Towards the end of the mashing process, the temperature was raised to 78° C. and the mash was separated by means of a dynamic cross-flow filtration system and, for comparison, with conventional lauter tun processes.

Wort-Flow with Dynamic Cross-Flow Filtration Systems

FIG. 1 gives a typical example for the lautering of mash and edulcorating of the spent grain by dynamic cross-flow filtration. Here, a PTFE membrane with an absolute retention rate of 0.1 μm was used. The average filtrate flows were 180 l/hm². The results were obtained using a husk-reduced powder grist (all fractions smaller than or equal to 100 μm, size distributions, see Table 3). In the literature (Schuster, Weinfurtner, Narziss (1985)) for typical malt grist according to Table 1 average filtrate flows are given with 460 l/hm² for the lauter tun, and 200 l/hm² for the mash filter. The use of a dynamic cross-flow filtration system gives specific filtrate flows in the same magnitude as with both conventional processes, and allows the use of a filter material which is finer by factor of 1000 as compared to the mash filter, and approximately 10,000 as compared to the lauter tun (size of transfer pores).

TABLE 3

Size distribution of husk-reduced powder grist

| Malt particle size | Powder grist |
|---|---|
| 20 μm ≦ | 63% |
| 20–30 μm | 18% |
| 30–50 μm | 10% |
| 50–100 μm | 8% |

FIG. 1 shows that with the process according to the present invention, last-running concentrations of below 1% were achieveable.

Wort Ingredients with Separation by Means of Dynamic Cross-Flow Filtration Systems and Lauter Tun Process for the Same, Average Dissolved Malt Comparative examinations were conducted with lauter tun grist and with the lauter tun process, as well as with finely ground powder grist, whereby 50% of the husk were separated, and use of a dynamic cross-flow filtration system, from equal malt batches. Table 4 gives typical wort data for such examinations.

TABLE 4

Wort ingredients for average dissolved malts, obtained with lauter tun process and dynamic cross-flow filtration system

| | Wort from lauter tun | Wort from dynamic cross-flow filtration |
|---|---|---|
| Extract, wfr[1] [%] | 81,9 | 87,8 |
| Total nitrogen [mg/100 ml] | 111.6 | 107.1 |
| FAN[2] [mg/100 l] | 23.3 | 20.9 |
| Polyphenols [mg/l] | 64 | 48 |
| Anthocyanogenes [mg/l] | 25 | 17 |
| β-Glucanes [mg/l] | 55 | 23 |

[1]water-free
[2]free amino-nitrogen

Due to partial husk-separation (50%) with powder grist, a total loss of extract of 1% has to be taken into account for powder grist, as compared to lauter tun grist. Thus, the process according to the present invention leads to a considerable gain in sugar yield (approx. 7%) as well as to a reduction of anthocyanogenes and β-glucanes, which is very advantageous for the final product.

Wort Ingredients for Badly Dissolved (Reduced Solubility) Malt

Table 5 gives the typical values for both processes for malt with reduced solubility.

TABLE 5

Wort ingredients for malt with reduced solubility, obtained with the lauter tun process and dynamic cross-flow filtration system

| | Wort from lauter tun | Wart from dynamic cross-flow filtration |
|---|---|---|
| Extract, wfr[1] [%] | 80.1 | 86.9 |
| Total nitrogen [mg/100 ml] | 111.7 | 90.6 |
| FAN[2] [mg/100 l] | 20.9 | 18.1 |
| Polyphenols [mg/l] | 60 | 43 |
| Anthocyanogenes [mg/l] | 25 | 15 |
| β-Glucanes [mg/l] | 86 | 48 |

[1]water-free
[2]free amino-nitrogen

The exemplary values of Tables 4 and 5 generally demonstrate the higher extract content of the wort obtained from cross-flow filtration, when using powder grist with partial husk separation. With both malts, the reduction of polyphenols as well as of anthocyanogenes, almost to the same extent, leads to a lighter beer color, a better taste of the beer and a better colloidal beer stability.

The reduction of the β-glucane contents to about half of their initial value with the cross-flow filtration wort has a decisive influence on the following steps of beer production. Identically produced beers from both worts show distinct differences with regard to their filterability. With the use of depth-filters (layers) as well as with surface filters (membranes), beers from wort obtained with cross-flow filtration exhibit a filtration velocity of double magnitude as compared to beers obtained from lauter tun wort.

With the Esser-test (standardized filterability test with 0.2 μm membranes) also a double filtrate flow was determined at a pressure difference of 0.5 bar.

Sensorical Assessment of Beers from Lauter Tun Wort and Cross-Flow Filtration Wort From two different malt batches (one averagely dissolved and one reduced solubility), worts were produced by lauter tun and dynamic cross-flow filtration, respectively, which were processed into beer in two separate, identical runs.

These beers were subsequently assessed in a covered tasting process. The results are given in Table 6.

Beers 1 to 4 were produced with average dissolved malt, beers 5 to 8 with malt with reduced solubility. With the order of rank of the beer assessment, 1 means the best sample, 8 means the worst sample.

For one lauter tun separation and cross-flow separation each, an identical starting malt A and B was used respectively.

TABLE 6

Assessment of taste of beers from lauter tun wort and dynamic cross-flow filtration wort

| Starting malt | Sample number | Wort separation | Order of rank for beer assessment | Bitter taste | Taste (general) |
|---|---|---|---|---|---|
| A | 1 | lauter tun | 8 | normal | malty |
| A | 2 | dyn. cross-flow | 3 | good | pure |
| B | 3 | lauter tun | 7 | normal | trace of diacetyl/malty |
| B | 4 | dyn. cross-flow | 5 | good | malty |
| A* | 5 | lauter tun | 6 | normal | slightly malty |
| A* | 6 | dyn. cross-flow | 2 | good | pure |
| B* | 7 | laurer tun | 4 | good | malty |
| B* | 8 | dyn. cross-flow | 1 | good | pure |

*shortened Eyben-mashing process

Comparative experimental runs were performed with two different filtration systems. The result is given in FIG. 4. On the one hand, the mash was filtrated with a folded filter. On the other hand, the mash was filtered according to the present invention with a dynamic cross-flow filtration system. With the filtrates, the glucane content was measured any one time. The upper curve of FIG. 4 shows the glucane content of the filtrate, which was obtained by use of a folded filter over the time of filtration. The lower curve shows the glucane content of the filtrate, as it was obtained by the process according to the invention, likewise over the time of filtration. The significant obtainable reduction of the glucane content, attainable in accordance with the present invention, in comparison with the glucane content of the filtrate obtained by a folded filter, is clearly discernible.

In the following table 7 the data based on FIG. 4 is given.

TABLE 7

β-glucane contents

| Sample number | 1 | 2 | 3 | 4 | 5 | 6 | 7 | 8 | 9 |
|---|---|---|---|---|---|---|---|---|---|
| GG % | 19.16 | 19.61 | 19.61 | 9.22 | 4.14 | 3.03 | 1.86 | 1.25 | 0.82 |
| Time in minutes | 0 | 15 | 30 | 37 | 53 | 67 | 80 | 94 | 107 |
| Mash filtered by shear clearance | 135 | 41.7 | 56.5 | 33.1 | 30.2 | 32.9 | 49.2 | 26.7 | 28.9 |
| Mash filtered by folded filter | 174.5 | 249.9 | 273 | 283.8 | 290.8 | 504.4 | 454.4 | 449.8 | 299 |

Filtration test 28.08.96 β-glucane contents

According to the present invention it is thus possible to control the β-glucane content (and also the content of other components of the wort) in a simple manner. For this purpose, for example, a mixing process can be used, in which wort obtained according to the present invention is mixed with one or more worts, having contents of β-glucane (and other components, respectively) differing from those of the first-mentioned wort, such that the next mixture exhibits the desired content of β-glucane (or other components).

What is claimed is:

1. Mashing process, wherein mash is filtered and wort is obtained, characterized in that the mash is fed to a filter material having a retentate side, a filtrate side, and a retention rate of below 2 μm of a dynamic cross-flow filtration system, namely a means for filtration, where the material to be filtered is moved in a volume segment between a filter surface and a further surface, with at least an essential component of the relative velocity between the material to be filtered and the filter surface, running along the filter area perpendicular to the normal of the filter area (cross-component), said cross-component being essentially produced by movement of surfaces within the cross-flow filtration system itself relative to the material to be filtered, wort is withdrawn from the filtrate side of the filter material and thickened remainder is withdrawn from the retentate side of the filter material.

2. Process according to claim 1 characterized by one or more of the following features:
   a) a dynamic cross-flow filtration system with rotating disks or concentrically rotating cylinders or with oscillating disks is used as a dynamic cross-flow filtration system;
   b) a material selected from:
      polymer membranes, especially polyamide membranes; PTFE membranes, PVDF membranes;
      steel;
      nickel; or
      ceramic;
      or a combination of two or more of such materials is used as a filter material;
   c) a closed, pressurized dynamic cross-flow filtration system is used as a dynamic cross-flow filtration system.

3. Process in accordance with claim 2, wherein said retention rate is 1 μm, to 0.04 μm.

4. Process according to claim 1 characterized by one or more of the following features:
   a) the mash used has a reduced husk content;
   b) the mash used has starch particles of a grain size of below 100 μm, preferably with a particle size distribution, wherein 99% of the particles have a grain size of below 100 μm, 70% of the starch particles have a grain size of below 65 μm, with a significant portion of the starch particles preferably having a bimodal particle size distribution (determined with a laser diffraction spectrometer; Helossystem, Sympactec) with distinct maxima at about 5 μm, and about 25 μm;
   c) the mash used is derived from finely ground powder grist;
   d) the mash includes modified malts;
   e) the mash comprises a mixture of at least two malt flowers of different specification.

5. Process in accordance with claim 4, wherein the husk content is 40 to 95% by weight based on the husk content in the starting mash of 100% by weight.

6. Process in accordance with claim 5, wherein the husk content is 50 to 80% by weight base on the husk content in the starting mash of 100% by weight.

7. Process according to claim 1 characterized by one or more of the following features:
   a) the operational flow rates, pressures and temperatures are such that a wort flow of 90 to 250 l/hm$^2$ is obtained;
   b) the portion of spent of the mash is edulcorated accelaratedly by the mash flow dynamic;

c) when operating, at least two dynamic cross-flow filtration systems (steps) are used in serial order;

d) filtration is such that the wort obtained is essentially free of particles which are larger than 0.1 μm;

e) no recycling of the initial feed is applied when operating.

8. Process in accordance with claim 7, wherein said retention rate is about 0.1 μm.

9. Process in accordance with claim 7, wherein the operational flow rates, pressures and temperatures are such that a wort flow rate of 130 or 200 l/m$^2$ is obtained.

10. Process in accordance with claim 7 wherein in feature c) the first wort is obtained from the first dynamic cross-flow filtration system, while from the second step and optionally from further steps second wort and spent grain are obtained.

* * * * *